United States Patent [19]

Ehmig

[11] Patent Number: 4,627,599
[45] Date of Patent: Dec. 9, 1986

[54] SEALING MECHANISM FOR HIGH VACUUM VALVE

[75] Inventor: Gerhard Ehmig, Rankweil-Brederis, Austria

[73] Assignee: Siegfried Schertler, Haag, Switzerland

[21] Appl. No.: 806,790

[22] Filed: Dec. 9, 1985

[30] Foreign Application Priority Data

Dec. 12, 1984 [DE] Fed. Rep. of Germany ....... 3445236

[51] Int. Cl.$^4$ ............................ F16K 1/38; F16K 1/42
[52] U.S. Cl. ..................................... 251/334; 251/333
[58] Field of Search ................................ 251/334, 333

[56] References Cited

U.S. PATENT DOCUMENTS 4,136,854 1/1979 Ehmig et al. ......................... 251/333
4,318,532 3/1982 Winkler ................................ 251/334

FOREIGN PATENT DOCUMENTS 2947585 8/1981 Fed. Rep. of Germany .

*Primary Examiner*—Arnold Rosenthal
*Attorney, Agent, or Firm*—Toren, McGeady, Stanger, Goldberg & Kiel

[57] ABSTRACT

A sealing device for a high vacuum valve having a movable member which is adapted to be moved to open and close said valve, wherein a first sealing surface is formed on the movable member and a second sealing surface is formed on a housing of the valve with the first and second sealing surfaces being moved relative to each other during movement of the movable member. The first and second sealing surfaces are spaced apart when the valve is in the closed position and a solid sealing member is interposed therebetween, the sealing member being formed with an annular configuration having an inner rounded edge and an outer rounded edge adapted to be engaged between the first and second sealing surfaces. The outer edge of the annular sealing member is formed with a smaller curvature than the inner edge.

4 Claims, 4 Drawing Figures

SEALING MECHANISM FOR HIGH VACUUM VALVE

The present invention is directed to a sealing mechanism for a valve and more particularly to a sealing arrangement for the closure of a high vacuum valve consisting of metal and including a first sealing face designed as a surface of revolution and a second sealing face also designed as a surface of revolution, the sealing faces lying coaxially with respect to each other, whereby the two sealing faces are adjustable against each other in the direction of their axes. In the closed position of the sealing devices, the two sealing faces are spaced from each other and between the two sealing faces lies a solid sealing member which bridges over the distance therebetween and which constitutes an independent component preferably designed as a conical angular disk which, in cross-section exhibits rounded edges on both sides which rest against and roll on the sealing faces during the closing process.

Such sealing devices are known in the prior art, for example, in DE-OS No. 29 47 585. The sealing member designed as a conical sealing disk comprises an inner edge and an outer edge, whereby the contour lines of these two edges, and, thus, of the sealing zones are necessarily sized differently. The difference between the outer and inner contour lines depends upon the width of the ring, and it is approximately expressed by the geometric relationship $\Delta u = 2 b\pi$, whereby b is the width of the annular sealing member. In order to close a valve of this type, considerable forces have to be applied.

The two sealing faces and the solid sealing body may consist of relatively hard, nonductile materials, for instance, of austenitic chrome-nickel steels. It lies, however, within the framework of the invention to utilize possibly softer materials here, for instance, copper, copper alloys, silver or silver alloys, to name only a few. It also lies within the framework of the invention to design the parts (sealing faces, sealing members) directly effecting the closing of the sealing device from materials of different hardness. The sealing faces are appropriately manufactured from relatively hard material and the sealing member from a relatively soft material in order thereby to constitute a simple replaceable part in case of inspection or overhaul of the valve or the closing apparatus.

The sealing forces on the two contour lines are necessarily of equal magnitude, since, however, the contour line of the inner edge is shorter than that of the outer edge. The specific material stress at the inner edge and thus at the inner sealing face is correspondingly higher than at the outer edge and at the outer sealing face. It can therefore not be excluded that the allowable material stress is already reached at the inner sealing line during closing of the sealing device, while, at the outer sealing line, there is not yet a sufficiently high pressure buildup to assure the sealing tightness of the sealing apparatus or device. If the closing pressure is therefore further increased, so that the necessary sealing pressure is also reached at the outer sealing line, then an excessive stress can already have appeared at the inner sealing ring. A theoretic circular line is designated as the sealing line, along which the sealing member and sealing face contact each other and which possesses, if only to a small extent, a surface spread.

Apart from the purely geometric circumstances, predetermined by the sizes and dimensioning of the active parts, the possibly differing material pairings or match have to also be considered here, for instance, the case of the inner sealing space being fabricated from relatively soft materials, the sealing member and the outer sealing face, however, from hard materials. Such measures can be imposed by the plant in which or the utilization purpose for which the closing apparatus is provided.

SUMMARY OF THE INVENTION

The present invention proposes that the rounded off edges of the sealing member exhibit different curvatures at the outer and at the inner contour, in order to maintain the stressing of the material within allowable limits under the respectively predetermined geometrical circumstances as well as with consideration of the material pairings (or material matching). The respective sealing line is so-to-say widened through the flatter curvature, and the sealing force, therefore, is distributed over a respectively larger area, and, thus, the specific stress per unit area of the material is reduced. According to a further characteristic of the invention, it is appropriate that the curvature at the outer edge of the sealing member is smaller than the curvature at the inner edge, this above all then, if materials of approximately equal strength and equal hardness are matched.

If the closure apparatus is closed and hereby the process contemplated, according to which the sealing faces designed as surfaces of revolution contact the sealing member along a sealing line on its outer and inner side, and, if subsequently, the sealing force is increased, then the rounded edges of the sealing member roll themselves off on the sealing faces. If the curvatures of the rounded edges are symmetric, then the "flattish" sealing line essentially retains its size, in spite of the increase of the closing force, so that, thereby, the specific area pressure on the matching parts is increased.

In accordance with another inventive characteristic, it is provided that the curvatures at the outer and inner edge referred to the central axis of a cross-sectional area of the sealing body are not symmetrical. Thanks to this measure, it is possible that, in the course of the described rolloff process, because of an increase of the closing force, the specific area pressure in the range of the "flattish" sealing line can be kept smaller than corresponds to the respective increase of the closing force, because, with increasing rolloff angle, the curvature of the face of the sealing member which rests against the sealing face continuously increases, whereby the contact area of the sealing line is increased.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described the preferred embodiments of the invention.

DETAILED DESCRIPTION OF THE PREFERRED EMBODIMENTS

Figure 1:
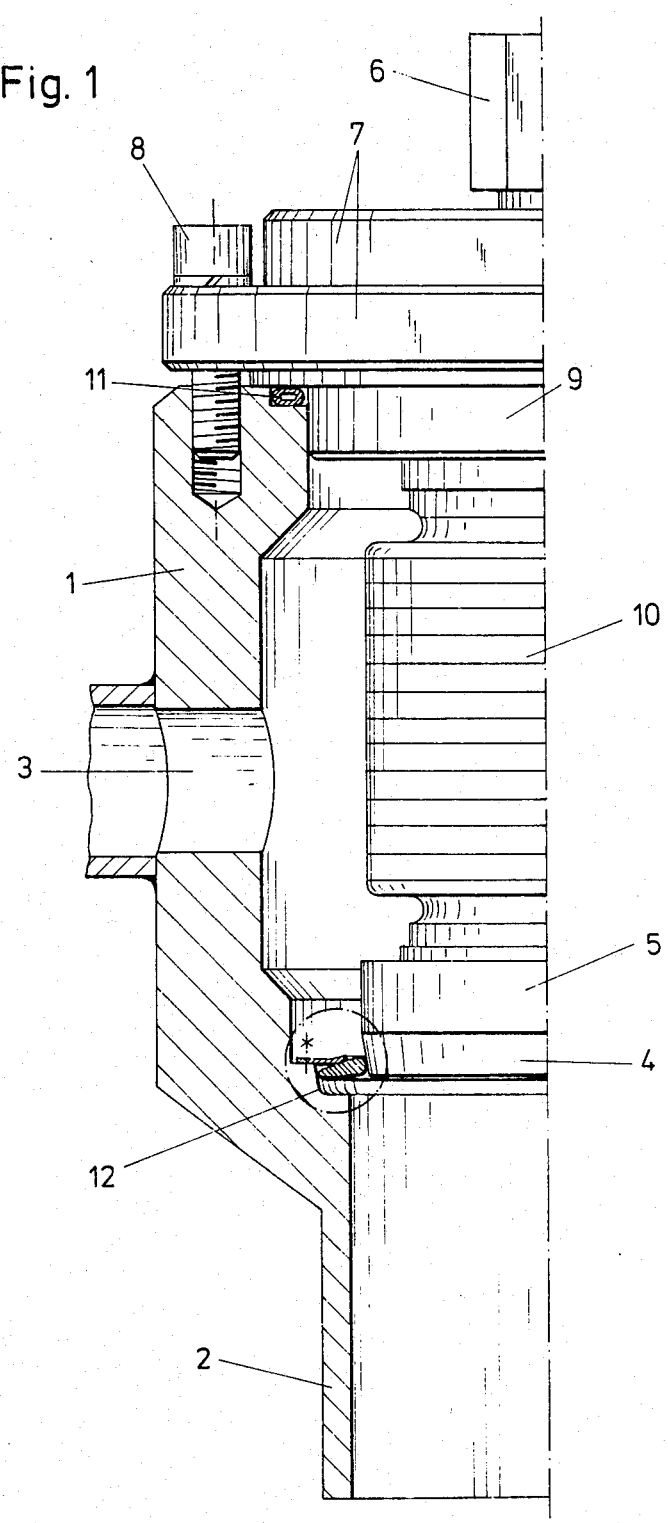
FIG. 1 is a longitudinal section through a valve in accordance with the invention.

FIG. 1 shows in longitudinal section a high vacuum valve with a housing 1 which exhibits a stub 2 serving for connecting a high vacuum pump and an opening 3 for connection to a device to be evacuated. A movable valve member 5 is formed with a sealing face 4 in the shape of a truncated cone which is fastened to the member 5 or can be designed to form one piece therewith. For axial displacement of this truncated cone-shaped sealing face 4 against the other sealing faces, the carrier 5 is connected with a spindle comprising a thread, of which only its upper connecting end 6 is visible in FIG. 1. The spindle is supported in a housing cover 7 which is solidly fastened with the housing 1 by means of screws 8. For the purposes of sealing the spindle, a flange plate 9 is inserted at the upper opening of the housing 1 at which a metal bellows 10, which embraces the spindle,is fastened in a sealing manner, whose lower end is connected with the carrier 5 in a sealing manner. Between the plate 9 and the housing 1, a sealing ring 11 is inserted in an annularly shaped recess.

The sealing face 12 provided in the housing 1 is designed here as a conical surface. An annular disk 13 operating as a sealing member rests freely against this conical surface 12. The disk 13 is provided with an inner edge 14 and an outer edge 14', the edges 14, 14' being rounded. The annular disk 13 is designed conically like a spring washer. In order to prevent the freely resting sealing member 13 from being lifted off the conical surface, retainer 15 is fastened at the upper border of the sealing face 12 at the housing 1 which projects against and rests at the sealing member 13. This retainer can be designed as one piece or it can also consist of several finger-like parts. The retainer 15 rests with its inner side at the upper side of the sealing member 13. The retainers 15 are designed as elastic springs. Their inner ends can be screwed, welded or connected in another manner with the sealing member 13.

Figure 2:
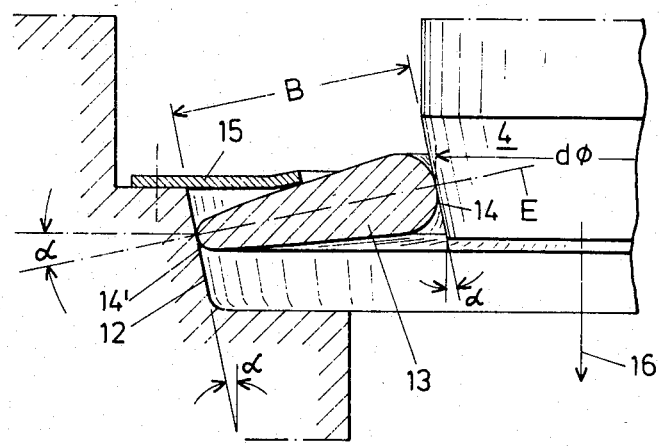
FIG. 2 is an enlarged sectional view of the detail circled in FIG. 1.
Figure 3:
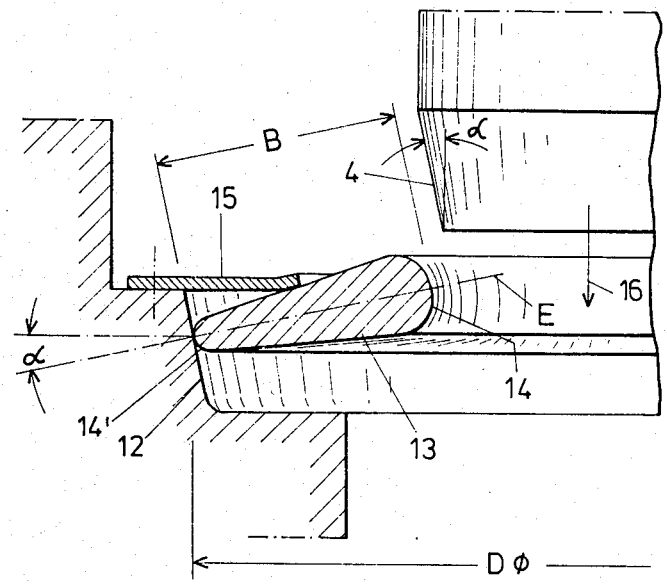
FIG. 3 shows the same detail as in FIG. 2, however, with the open valve.

The sealing member 13 is depicted in FIGS. 2 and 3 on an enlarged scale when compared with FIG. 1. It consists of a conical, spring washer-like disk with the rounded edges 14, 14'. It is important that the inner edge 14, as can be seen clearly from FIG. 2, be formed with a considerably greater radius of curvature than the outer edge 14'. In the curvature of the edges 14, 14' shown in this embodiment, there are provided circular-arc curvatures, as seen in cross-section through the sealing member 13. When viewed in three-dimension, they present themselves as partial surfaces of a torus. The curvature lines, which present themselves as circular arc lines in cross-section through the sealing member 13, lie here essentially symmetrically to the cross-sectional central axis.

Figure 4:
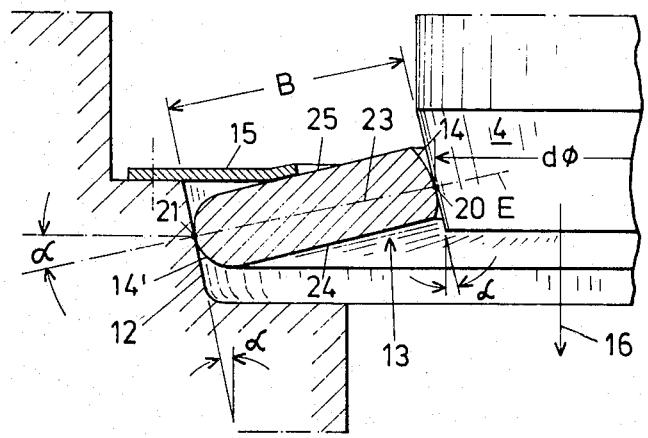
FIG. 4 is a sectional view illustrating in detail another embodiment.

It is conceivable within the framework of the invention to provide curvature lines at the edges 14, 14' which are not circular arc curves, whereby the curvature lines at the outer and inner edge lie unsymmetrically referred to the cross-sectional central axis of the sealing member 13. Such an embodiment is schematically presented in FIG. 4, whereby the same parts as in FIGS. 1–3 have been assigned the same reference numerals. But also in this case, as in the example of the embodiment of FIG. 4, the curvature at the outer edge 14' of the sealing member 13 is smaller than the curvature at the inner edge 14. FIG. 4 illustrates that moment when the sealing parts contact each other during the closing process of the valve. It can also be recognized from this presentation in FIG. 4 that a connecting line 23 of points of contact 20 and 21 is positioned obliquely with respect to outer boundary surfaces 24 and 25 of the sealing member 13.

The sealing faces 4 and 12 are designed as conical surfaces in the embodiments shown, whereby the central diameter D of the sealing face provided in the housing 1 corresponds to the outside diameter of the conical sealing member 13, so that this conical sealing member 13 freely rests on this sealing face 12. If the second sealing face 4 is moved in the direction of the arrow 16 by actuation of the valve spindle 6, then this sealing face 4 pushes with its central zone onto the inner edge 14 of the sealing body 13. The middle diameter of the conical surface of the sealing face 4 corresponds approximately to the inside diameter d of the sealing member 13. The first contact of these parts with each other during closing of the sealing device is shown in FIGS. 2 and 4. The sealing faces 4 and 12 are essentially parallel to each other here.

If, subsequently, an appropriately high closing pressure is applied by the spindle 6, then the sealing face 4 migrates further in the direction of the arrow 16, whereby the faces resting against each other are deformed on their surface in the elastic range, because of the high pressure with which these parts are pressed against each other. Because of the selected arrangement, the force applied by the spindle 6 is magnified with a high stepup ratio, whereby this stepup ratio is primarily determined by an angle α which corresponds to the apex angle of the conical surfaces and which is shown in FIG. 3. Thus, the disk-like sealing member 13 rolls off against the respective sealing faces 4 and 12 with its two edges 14, 14'. The sealing member 13 can thereby also deform itself more or less in its entirety. The extent of such a deformation depends among other reasons on its thickness. With regard to the relative movements and rolloff processes or the like mentioned herein, it must be pointed out that these movements and rolloff travel are very small, since the sealing faces 4 and 12 as well as the sealing member 13 consists of nonductile metallic materials.

It can be recognized from FIGS. 2 and 3 that the line of contact between the sealing face 4 and the inner edge 14 is considerably greater because of the large curvature of this edge than the line of contact between the sealing face 12 and the outer edge 14' of the sealing body 13. Since the same sealing force must prevail along both lines of contact, the specific material or unit area loading is essentially equal, due to the inventive measure, in spite of the differing lengths of the contact lines. The curvatures can thus be adapted to each other in such a way that the specific material or specific unit loading along the outer and the inner contact lines are at least of the same order of magnitude. With reference to lines of contact, it must be explicitly pointed out in this connection that reference is made herein to lines in the strictly geometrical sense. Rather, there are here referred to sealing zones of circularly shaped form, with a finite width, in spite of the fact that this width referred to the contour length is indeed very small.

It can be seen from FIG. 2 that even relatively large axial movements between the sealing faces 4 and 12 which can, for instance, be caused by thermal expansion or temperature differences, can be absorbed easily by this sealing arrangement, because, in this case, the sealing member rolls slightly with both of its sides on the sealing faces without impairing the sealing capacity because the large sealing forces applied by the spindle 6 readily permit such differences.

It must also be observed that the retainer 15 can be arranged not at the housing, but also at the movable part.

In the embodiment shown and described, the sealing faces 4 and 12 are designed as conical surfaces. The inventive task can be solved also if these sealing faces are designed as spherical surface zones, whereby, for this purpose, concave as well as convex surfaces can be utilized. Also, the use of conical surface zones and spherical surface zones as sealing faces in a sealing device is conceivable, since, indeed, these faces do not directly come in actuating connection with each other during closing of the sealing device. These faces are always designed in such a way that the sealing body 13 or its edges 14, 14' can roll off unopposed along these surfaces when the sealing device is being opened or closed. With reference to the rolling-off process, the respective distances traveled and the deformations are very small.

It has been assumed in the previously described embodiments in FIGS. 1-4 that the active parts are fabricated from relatively hard nonductile materials, whereby the elastic deformation range of the material is not exceeded by the forces which can be applied from the outside. Sealing members are respectively shown and described herein, whose curvature at the outer edge is smaller than at the inner edge. When matching materials of another sort, above all, if relatively soft materials in the sense of this invention, have been utlized in the central area of the valves, there can arise the necessity on the basis of the predetermined geometrical circumstances and the additionally to be considered matching of materials, to design the sealing member in such a way that its curvature at the outer edge is larger than the curvature at the inner edge. In all cases, reference is made to curvatures of the edges, which lie in a cross-sectional plane of the sealing member, which contains its central middle axis.

Thus, in accordance with the invention, there is provided a sealing device for the closing of a high vacuum valve which comprises the first sealing face 4 designed as a surface of revolution, and the second sealing face 12 also designed as a surface of revolution which lies coaxially with respect to the first sealing face. Both sealing faces 4 and 12 are adjustable with respect to each other in the direction of their axes. Between the two sealing faces 4, 12 is an independent component bridging over their distance in the shape of the ring-shaped, preferably conical, annular disk 13. This annular disk 13, which acts as a sealing member, comprises the rounded outer and inner edges 14 and 14'. For compensation of the differing specific stresses, because of the sealing zones of different lengths at the external side or the inner side of the sealing member 13 and/or because of the different materials which have been used for the fabrication of the sealing faces on the one hand and the sealing member on the other hand, the rounded-off edges 14, 14' of the sealing member 13 exhibit different curvatures (FIG. 2) at the outer and at the inner contour and in the cross-sectional plane containing the central axis of the sealing member.

While specific embodiments of the invention have been shown and described in detail to illustrate the application of the inventive principles, it will be understood that the invention may be embodied otherwise without departing from such principles.

What is claimed is:

1. A sealing mechanism for a high vacuum valve device including a movable member having a longitudinal axis and movable in the direction of said axis for opening and closing said valve device comprising:

a first sealing surface designed as a surface of revolution;

a second sealing surface also designed as a surface of revolution arranged coaxially relative to said axis with said first surface;

one of said first and second sealing surfaces being formed on said movable member, said sealing surfaces being movable relative to each other in the direction of said axis by movement of said movable member and being located spaced from each other in the closed position of said valve device; and a solid sealing member configured as a conical annular disk arranged between said first and second sealing surfaces adapted to bridge the space therebetween, said solid sealing member being formed with rounded edges on opposite sides thereof, said rounded edges being located to engage and roll off against said first and second sealing surfaces respectively during the process of closing said valve device;

said rounded edges being formed with different radii of curvature.

2. A sealing mechanism according to claim 1, wherein said rounded edges of said sealing member comprise an inner edge and an outer edge and wherein the radius of curvature of said outer edge is smaller than the radius of curvature of said inner edge.

3. A sealing mechanism according to claim 2, wherein said sealing member defines a middle axis extending between said inner and outer edges and wherein the curvatures of said inner and outer edges are unsymmetrical taken with reference to said middle axis.

4. A sealing mechanism according to claim 1, wherein said first sealing surface is formed on said movable member, wherein said valve device includes a housing having said second sealing surface formed thereon, wherein said rounded edges comprise an inner rounded edge arranged to engage against said first sealing surface and an outer rounded edge arranged to engage against said second sealing surface and wherein the curvature of said outer edge is smaller than the curvature of said inner edge.

* * * * *